(12) United States Patent
Zamanzadeh et al.

(10) Patent No.: US 11,821,796 B2
(45) Date of Patent: Nov. 21, 2023

(54) REMOTE STRUCTURE TEMPERATURE MONITOR

(71) Applicant: MATERGENICS, INC., Pittsburgh, PA (US)

(72) Inventors: Mehrooz Zamanzadeh, Pittsburgh, PA (US); Carolyn Tome, Pittsburgh, PA (US); Clinton Char, Pittsburgh, PA (US); Nathan Pace, Pittsburgh, PA (US)

(73) Assignee: MATERGENICS, INC., Pittsburgh, PA (US)

( * ) Notice: Subject to any disclaimer, the term of this patent is extended or adjusted under 35 U.S.C. 154(b) by 0 days.

(21) Appl. No.: 18/076,609

(22) Filed: Dec. 7, 2022

(65) Prior Publication Data

US 2023/0100745 A1  Mar. 30, 2023

Related U.S. Application Data

(63) Continuation-in-part of application No. PCT/US2021/051038, filed on Sep. 20, 2021.

(60) Provisional application No. 63/081,281, filed on Sep. 21, 2020.

(51) Int. Cl.
  *G01K 1/024* (2021.01)
  *G01K 1/14* (2021.01)
  *H04W 88/08* (2009.01)

(52) U.S. Cl.
  CPC .............. *G01K 1/024* (2013.01); *G01K 1/14* (2013.01); *H04W 88/08* (2013.01)

(58) Field of Classification Search
  CPC ............ G01K 1/024; G01K 1/14; G01K 7/02; G01K 7/04; G01K 13/00; H04W 88/08
  See application file for complete search history.

(56) References Cited

U.S. PATENT DOCUMENTS

| | | | | |
|---|---|---|---|---|
| 3,637,985 | A | * | 1/1972 | Stacey .................. G08C 17/02 374/E1.004 |
| 4,541,545 | A | * | 9/1985 | Beattie .................. E05G 1/024 220/88.1 |
| 7,285,203 | B2 | * | 10/2007 | Russell .................. C23F 13/04 205/777 |
| 8,682,600 | B2 | * | 3/2014 | Genta .................. G01M 3/2815 340/432 |
| 2005/0195093 | A1 | | 9/2005 | Karschnia et al. |
| 2012/0229283 | A1 | * | 9/2012 | Mckenna ............. G08B 29/183 340/584 |

(Continued)

FOREIGN PATENT DOCUMENTS

WO  WO-2013140671 A1 * 9/2013 .......... G08B 17/005

*Primary Examiner* — Brandi N Hopkins
*Assistant Examiner* — Janice M Soto
(74) *Attorney, Agent, or Firm* — Thomas M. Joseph, Esq.

(57) ABSTRACT

A data collection device and a temperature monitor unit monitors the temperature of a remote structure. The temperature monitor unit has a thermocouple, a communications device assembly having an antenna and a transmitter, a power supply for powering the controller and the communications device, and an enclosure for surrounding the communications device and the power supply with the thermocouple and the antenna extending therethrough. The communications device obtains a temperature from the thermocouple and activates the transmitter to send the temperature to the data collection device through the antenna.

20 Claims, 6 Drawing Sheets

(56) References Cited

U.S. PATENT DOCUMENTS

| | | |
|---|---|---|
| 2013/0038471 A1 | 2/2013 | Harless |
| 2013/0201316 A1 | 8/2013 | Binder et al. |
| 2015/0276498 A1 | 10/2015 | Van et al. |
| 2016/0320249 A1 | 11/2016 | Reiman et al. |
| 2018/0374330 A1* | 12/2018 | Balaji .................. G08B 29/145 |
| 2019/0072434 A1* | 3/2019 | Robichaud ............... G01K 1/12 |

* cited by examiner

REMOTE STRUCTURE TEMPERATURE MONITOR

CROSS REFERENCE TO RELATED APPLICATION

This application is a continuation-in-part of PCT Patent Application No. PCT/US21/51038 entitled "REMOTE STRUCTURE TEMPERATURE MONITOR" filed Sep. 20, 2021, published as WO/2022/061211 on Mar. 24, 2022, which claims the benefit under 35 U.S.C. § 119(e) of U.S. Provisional Application No. 63/081,281 entitled "REMOTE STRUCTURE TEMPERATURE MONITOR" filed Sep. 21, 2020 which is incorporated herein by reference.

TECHNICAL FIELD

The subject disclosure is directed to systems, methods, and apparatus for monitoring the temperature of a remote structure, such as a telecom structure, and, more particularly, to a system that utilizes a remote temperature monitor unit that can be buried below the remote structure.

BACKGROUND ART

Wildfires have become a significant concern in Australia, Michigan, Canada, and the West Coast of the United States in recent years. During a wildfire, the mechanical properties of steel can deteriorate under elevated temperatures. This can result in embrittlement, reductions in yield strength, stiffness, and modulus of elasticity. This deterioration can cause deflections, local buckling, and twisting of the steel members. Fire hazards in tower applications and related remote structures can result in significant safety problems in high consequence areas (HCA), as well as economic and asset losses.

Many of these structures are formed from steel. The mechanical properties of steel are temperature-dependent. With increased temperature, the yield strength (>400° C.) and the modulus of elasticity (>200° C.) decreases. If the temperature is above 600° C., about 50% of the tensile strength will be lost. If the temperature does not exceed 600° C. and there is no prolonged exposure to a wildfire, the mechanical properties will return to their initial values after cooling down. If steel is exposed to temperatures above 600° C. for about 20-30 minutes, oxidation will appear on the surface. The surface will also pit, and the steel will lose cross-sectional thickness.

The heat from a fire can have several different adverse effects on a steel structure, including deterioration, deformation and creep, softening, hardening, and liquid metal embrittlement ("LME"). Deterioration results when both the physical and mechanical properties of a steel structure are adversely affected by a wildfire event. Based on the temperature and the duration of exposure, physical properties such as thermal conductivity, electrical conductivity, the coefficient of thermal expansion deteriorate. Moreover, mechanical properties such as tensile strength, yield strength, ductility, hardness, and toughness could also be affected adversely. Additionally, permanent changes in the microstructure can occur.

Deformation and creep can occur when certain metals are exposed to elevated temperatures under a static load. Typically, the tensile strength of steel is measured at room temperature, approximately 21° C. However, as the tensile strength decreases as the temperature increases. At elevated temperatures, a steel structure can deform under stress and its own weight or possibly even collapse. Deformation can cause cracking of the structure at bolt holes, welds, and at locations of stress concentration.

The elevated temperatures that result from wildfires can cause steel to soften and to remain soft, permanently, with lower tensile strength values. The degree of softening will depend upon the temperature that is reached during the wildfire, the time at which the temperature is reached, and the cooling rate. Slow cooling rates generally result in softening.

Elevated temperatures associated with a fire can also cause hardening. When this occurs, the steel becomes harder with higher tensile strengths, but lower impact strengths. Harder, more brittle conditions, can be achieved if the temperature exceeds the lower critical temperature of about 715° C. when the structure is cooled, rapidly, by water or precipitation. The degree of hardening is dependent upon the carbon content and the alloying content of the steel.

When the temperature remains above about 715° C. for a prolonged time, grain growth can occur, which will negatively affect mechanical properties of the steel structure. Should lower portions of the structure be covered in vegetation at the time of the fire, and if the steel temperature exceeds the lower critical temperature of about 715° C., then carburization of the steel can occur. Carburization can cause a greater degree of hardening and, upon quenching, will increase the brittleness of the steel.

LME can occur in galvanized steel, which is steel that has been coated with zinc. The melting point of zinc is about 420° C. When temperatures exceed the melting point of zinc, a loss of the galvanized coating occurs. The loss of the galvanized coating causes LME, as liquid zinc penetrates the steel surface at high temperatures. LME is a serious risk for galvanized anchors exposed to wildfires.

Additionally, some remote structures include organic coatings that can be charred or consumed entirely by fire. Due to the potential damage that wildfires can inflict upon remote metal structures, there is a need for apparatus and system for monitoring the temperature of such structures.

DISCLOSURE OF INVENTION

In various implementations, an apparatus includes a thermocouple, a communications device having an antenna and a transmitter for communicating with a remote monitoring system, a controller for controlling the communications device, a power supply for powering the controller and the communications device, and an enclosure for surrounding the communications device, the controller, and the power supply. The enclosure includes a body formed from insulating material with at least one hole therein and with the thermocouple and the antenna extending through the at least one hole. The controller receives a temperature-dependent voltage from the thermocouple, determines the temperature, and instructs the communications device to activate the transmitter to send information relating to the temperature to the remote monitoring system through the antenna.

MODES FOR CARRYING OUT THE INVENTION

The subject disclosure is directed to systems, methods, and apparatus for monitoring the temperature of a remote structure, such as a telecom structure, and, more particularly, to a system that utilizes a remote temperature monitor unit that can be buried below the remote structure. The remote temperature monitor can measure the temperature and transmit the temperature to a data collection device in real time. The remote temperature unit is enclosed in insulating material that has the ability to endure 0.5 hours of fire at a temperature of about 840° C. The unit can be sold in an unassembled form as a kit.

The detailed description provided below in connection with the appended drawings is intended as a description of examples and is not intended to represent the only forms in which the present examples can be constructed or utilized. The description sets forth functions of the examples and sequences of steps for constructing and operating the examples. However, the same or equivalent functions and sequences can be accomplished by different examples.

References to "one embodiment," "an embodiment," "an example embodiment," "one implementation," "an implementation," "one example," "an example" and the like, indicate that the described embodiment, implementation or example can include a particular feature, structure or characteristic, but every embodiment, implementation or example can not necessarily include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic can be implemented in connection with other embodiments, implementations or examples whether or not explicitly described.

Numerous specific details are set forth in order to provide a thorough understanding of one or more embodiments of the described subject matter. It is to be appreciated, however, that such embodiments can be practiced without these specific details.

Various features of the subject disclosure are now described in more detail with reference to the drawings, wherein like numerals generally refer to like or corresponding elements throughout. The drawings and detailed description are not intended to limit the claimed subject matter to the particular form described. Rather, the intention is to cover all modifications, equivalents and alternatives falling within the spirit and scope of the claimed subject matter.

Figure 1:
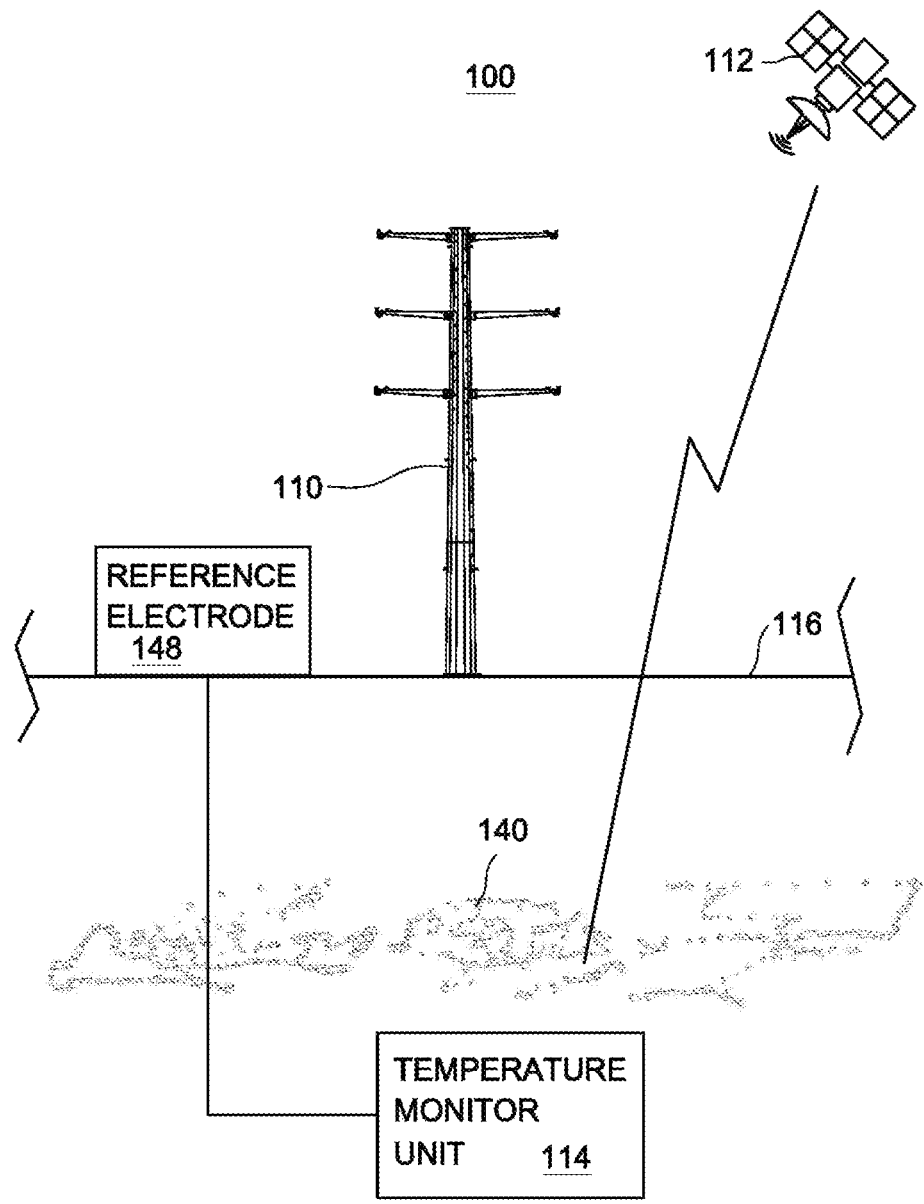
FIG. 1 is a fragmentary schematic view of a system for monitoring the temperature of a remote structure in accordance with this disclosure.
Figure 2:
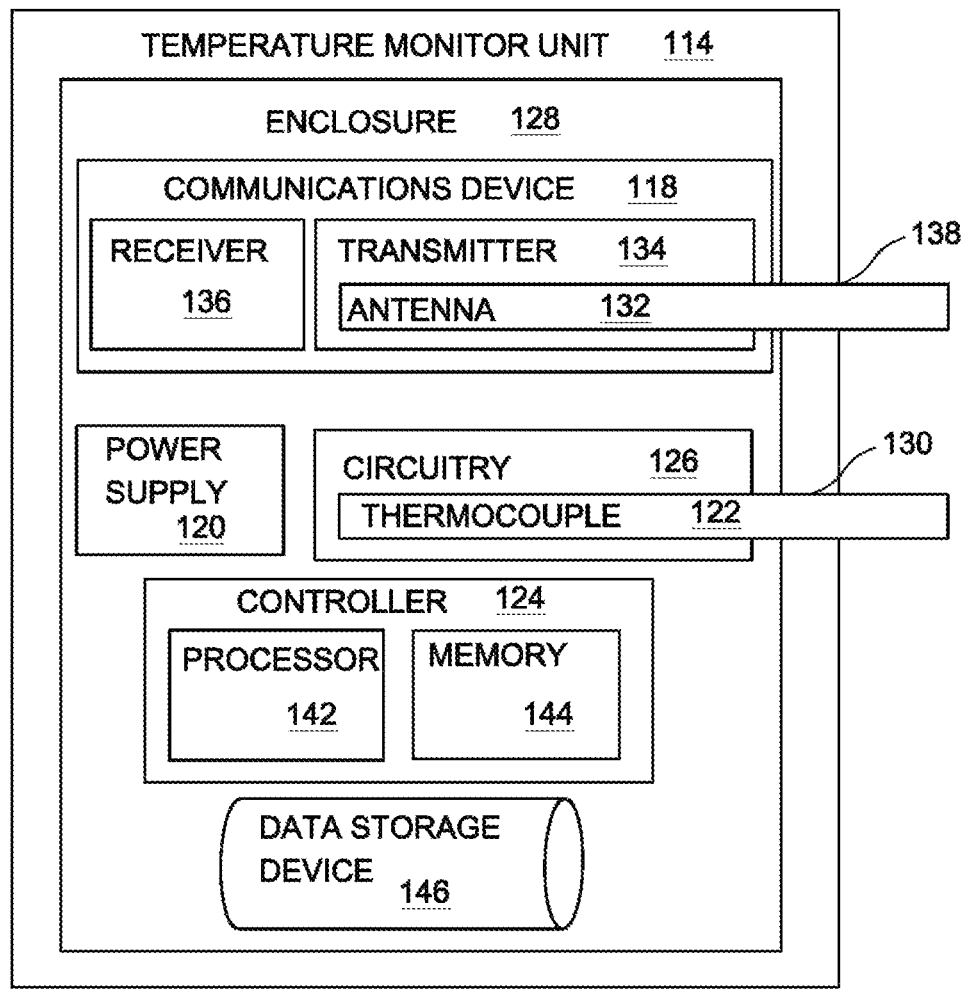
FIG. 2 is a block diagram of a temperature monitor unit in accordance with this disclosure.

Referring now to FIGS. 1-2, there is illustrated a system, generally designated by the numeral 100, for monitoring the temperature of a remote structure 110. The system 100 is particularly adapted to monitor temperatures around the structure 110 during a wildfire, when it may not be possible to approach the structure 110 to obtain such measurements.

The system 100 includes a data collection device 112 and a temperature monitor unit 114. The temperature monitor unit 114 can be buried below the remote structure 110, within the ground 116, to protect the temperature monitor unit 114 from wildfires.

In this exemplary embodiment, the data collection device 112 is a satellite that can be used within a satellite communications system. The satellite communication system can utilize pre-existing satellite infrastructure, such as the IRIDIUM® system. IRIDIUM is a registered trademark of Iridium, Inc. of Washington, D.C.

The temperature monitor unit 114 includes a communications device 118, a power supply 120, a thermocouple 122, and a controller 124 that connects to the communications device 118 and the thermocouple 122 with circuitry 126. The communications device 118, the power supply 120, and the controller 124 are enclosed within a body that forms an enclosure 128 that includes a hole 130. The thermocouple 122 extends through the hole 130. The power supply 120 can power the communications device 118 and the controller 124.

The thermocouple 122 has the ability to obtain a voltage that corresponds to a temperature. The communications device 118 can obtain a temperature from the thermocouple 122 and send the temperature to the data collection device 112.

The communications device 118 can include an antenna 132 and a transmitter 134. The transmitter 134 has the ability to communicate with the data collection device 112 through the antenna 132. The antenna 132 can extend through a hole 138 in the enclosure 128. The holes 130 and 138 can be packed with insulation to further protect the communications device 122 and the controller 124.

The controller 124 can receive a temperature-dependent voltage from the thermocouple 122. The controller 124 can include a voltmeter that can determine the temperature from the temperature-dependent voltage that is received from the thermocouple 122. Then, the controller 124 can instruct the communications device 118 to activate the transmitter 134 to send information relating to the temperature to the data collection device 112.

The transmitter 134 can be a transmitter or a transceiver. In some embodiments, the communications device 122 can include a receiver 136 that can receive instructions that can be transmitted to the controller 124. The transmitter 134 can include a cellular signal generator. The cellular signal generator can be a function generator, an RF signal generator, a microwave signal generator, a pitch generator, an arbitrary waveform generator, a digital pattern generator, or a frequency generator.

The power supply 120 can be a portable power supply. In some embodiments, the power supply 120 can be a battery or a set of batteries. In such embodiments, the batteries can be selected to power the temperature monitor unit 114 under normal conditions (i.e., non-elevated temperatures) for five years.

The circuitry 126 can be configured and implemented for thermocouple temperature measurement through the thermocouple 122. In some embodiments, the thermocouple 122 is selected for measurement of temperatures of at least about 600° C. so a thermocouple. The resolution of the measurement can be limited, in part, to reduce the communication requirements because a higher resolution of measurement is not required in such embodiments. The frequency of the temperature readings can be fixed of variable. Power requirements will be made as small as possible to extend the life of the power supply 120.

As shown in FIGS. 1-2, the enclosure 128 is buried underground. The enclosure 128 can include a body that formed from an insulating material. The insulating material can be any suitable material that includes an insulator, which could include ceramics, glasses, polymers, and composites. The insulating material can be a fire proof material and fire resistant material. Insulating material 140 with the ground can provide additional insulation to the enclosure 128.

The insulating material can include captured fire insulation. In some embodiments, the insulating material has the ability to endure 0.5 hours of fire at a temperature of about 840° C. In this exemplary embodiment, the enclosure 128 can be SentrySafe Keyed Fire Resistant Waterproof Chest Safe that has been modified to include the holes 130 and 138, which is sold by Master Lock Company LLC of Oak Creek, Wisconsin.

As shown in FIG. 2, the controller 124 can include a processor 142 and memory 144 for storing instructions therein. The temperature monitor unit 114 can include a data storage device 146 for recording information relating to the temperatures that are measured with the thermocouple 122. The processor 142 can be programmable or hard-wired to perform a particular function or set of functions. In the embodiments in which the processor 142 is programmable, instructions, programs, and/or related data, information, and data structures can be stored in memory 144 and the data storage device 146.

In some embodiments, the temperature monitor unit 114 can be connected to a reference electrode 148 to monitor the corrosion of the structure 110.

The data storage device 146 can be any suitable data storage device, such as a hard drive disk, a floppy disk, a tape, a compact disc (CD), a DVD, a blu-ray disc, a USB flash drive or memory stick, a secure digital card (SD card), or a solid-state drive (SSD).

Figure 3:
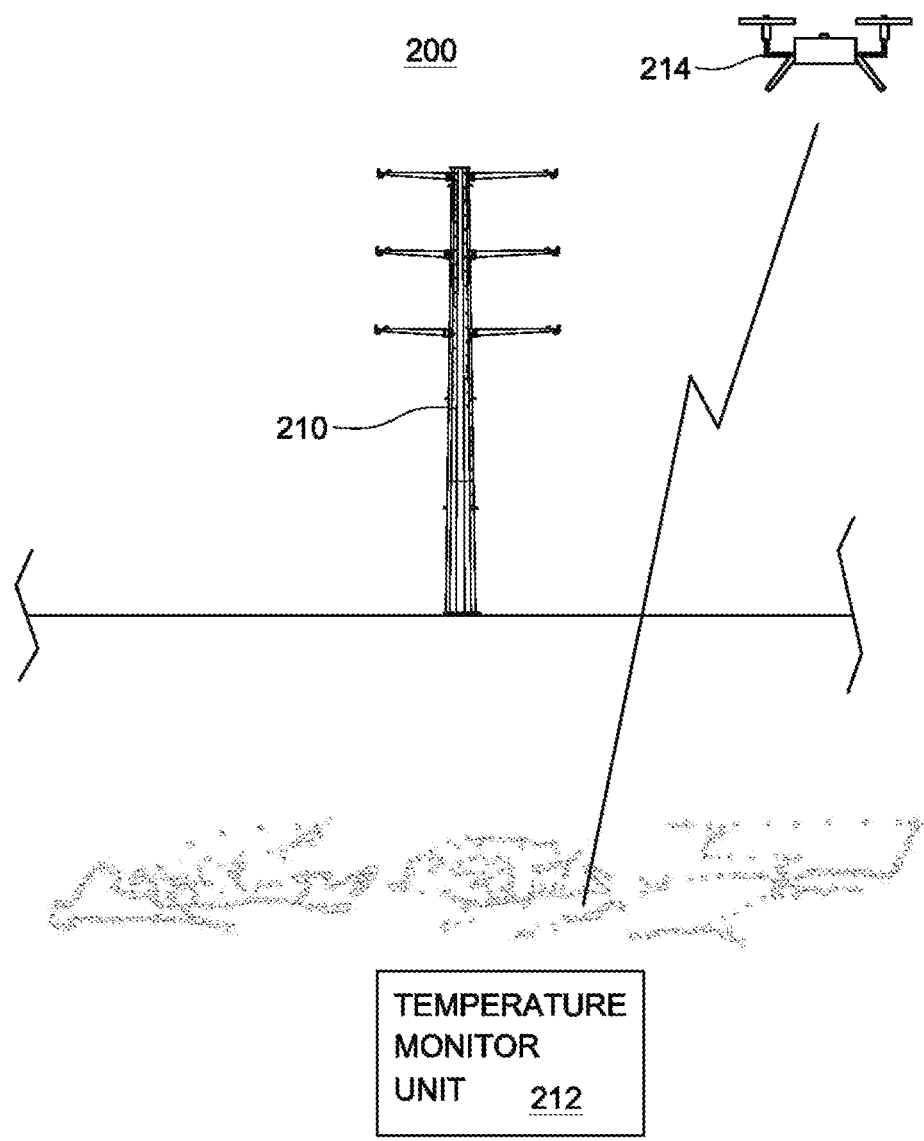
FIG. 3 is a fragmentary schematic view of another embodiment of a system for monitoring the temperature of a remote structure in accordance with this disclosure.

Referring now to FIG. 3 with continuing reference to the foregoing figures, another embodiment a system, generally designated by the numeral 200, for monitoring the temperature of a remote structure 210 is shown. Like the embodiment shown in FIGS. 1-2, the system 200 includes a temperature monitor unit 212 that is buried underneath the remote structure 210.

Unlike the embodiment shown in FIGS. 1-2, the system 200 includes a data collection device 214 in the form of a vehicle. In this exemplary embodiment, the vehicle is a drone. In alternative embodiments, the vehicle can be a helicopter, an automobile and/or a utility vehicle.

The data collection device 214 can be considered as a "drive by" technique. In some embodiments, the technique can utilize a short range RF communication with the data collection device 214 including a receiver (not show) that is within the transmission range of the temperature monitor unit 212. In such embodiments, the transmission range can be less than a mile. The data collection device 214 can store temperature readings until the data collection device 214 connects thereto and obtains the readings.

Figure 4:
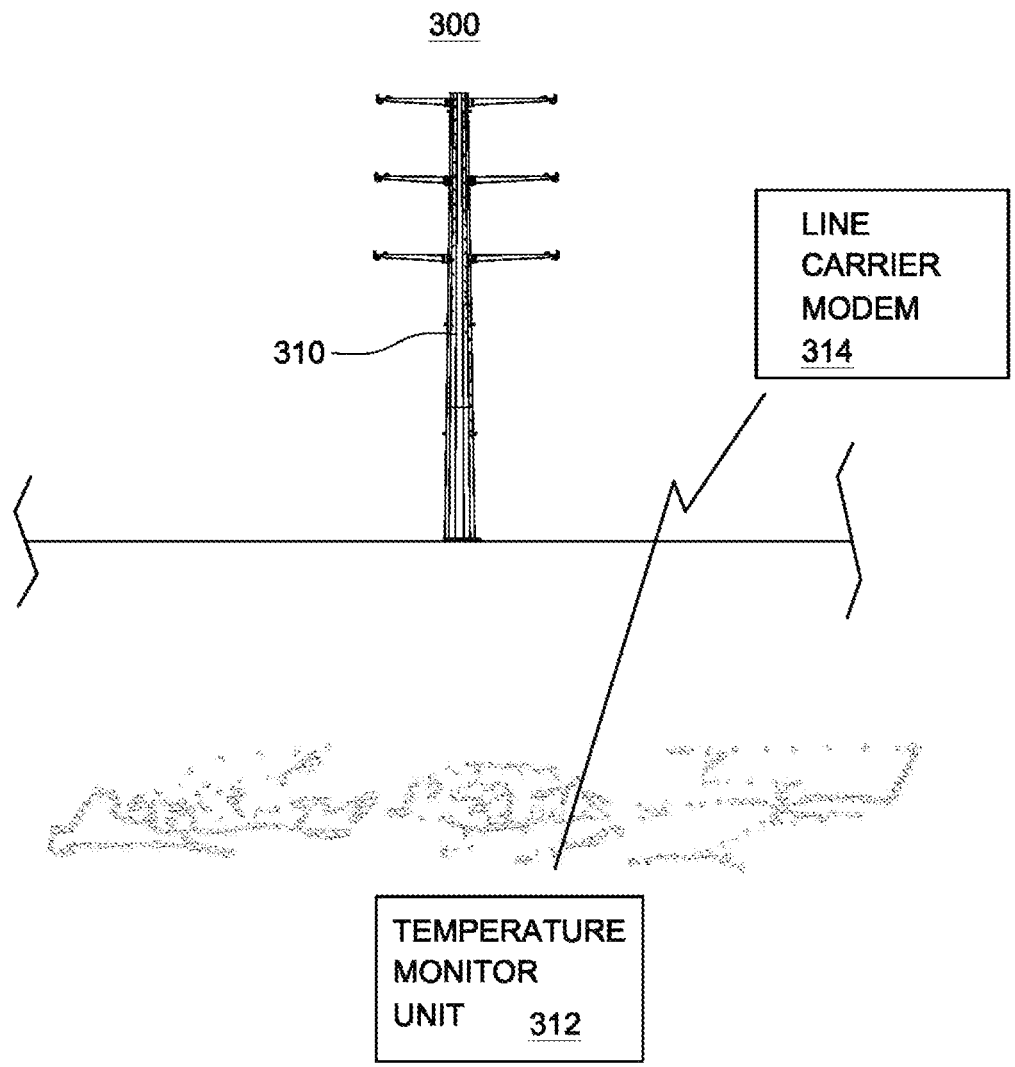
FIG. 4 is a fragmentary schematic view of another embodiment of a system for monitoring the temperature of a remote structure in accordance with this disclosure.

Referring now to FIG. 4 with continuing reference to the foregoing figures, another embodiment a system, generally designated by the numeral 300, for monitoring the temperature of a remote structure 310 is shown. Like the embodiment shown in FIGS. 1-3, the system 300 includes a temperature monitor unit 312 that is buried underneath the remote structure 310.

Unlike the embodiment shown in FIGS. 1-3, the system 300 includes a data collection device 314 in the form of a line carrier modem. In such embodiments, the system 300 can utilize existing high-voltage transmission lines to transmit data. The system 300 can utilize existing infrastructure for communication.

Figure 5:
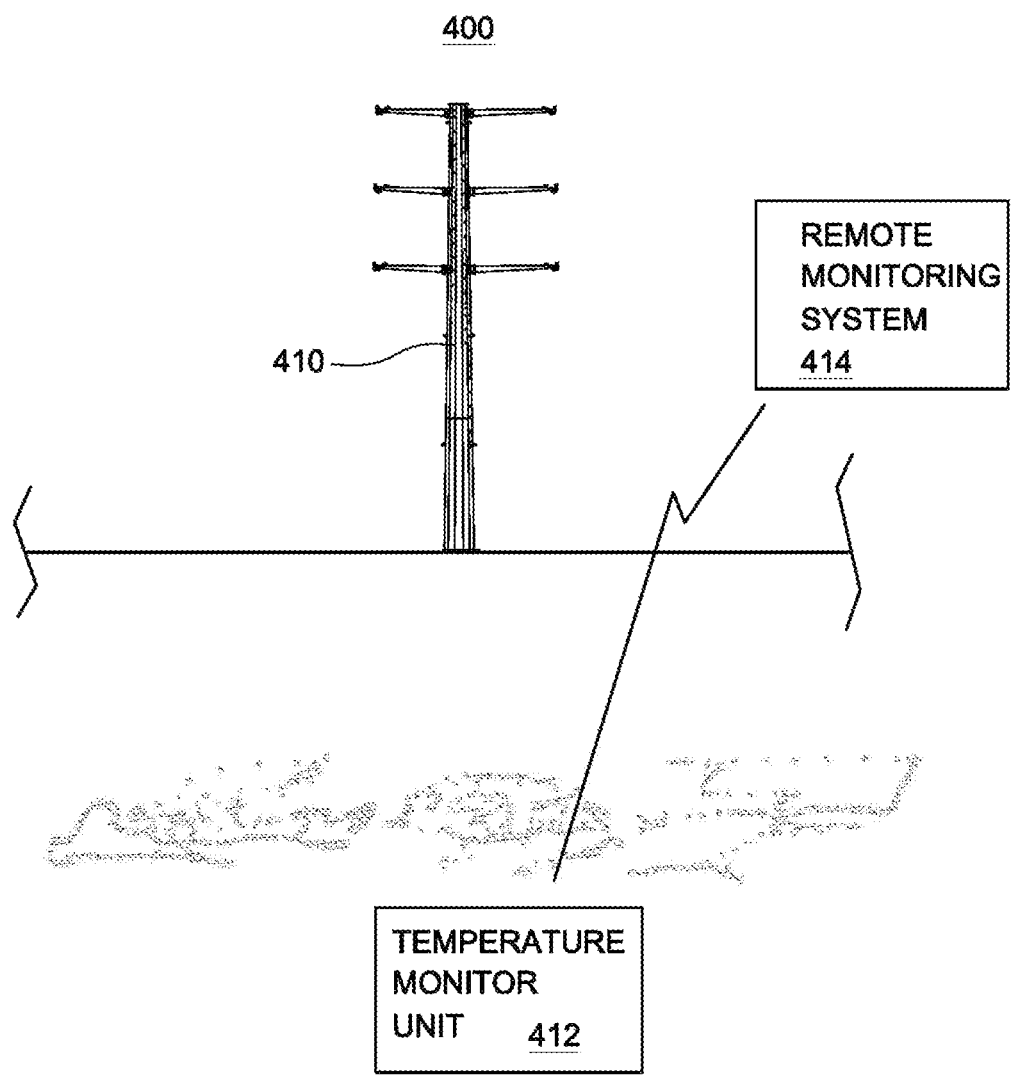
FIG. 5 is a fragmentary schematic view of another embodiment of a system for monitoring the temperature of a remote structure in accordance with this disclosure.

Referring now to FIG. 5 with continuing reference to the foregoing figures, another embodiment a system, generally designated by the numeral 400, for monitoring the temperature of a remote structure 410 is shown. Like the embodiment shown in FIGS. 1-4, the system 400 includes a temperature monitor unit 412 that is buried underneath the remote structure 410.

Unlike the embodiment shown in FIGS. 1-4, the system 400 includes a data collection device 414 in the form of a remote test station monitor. In some embodiments, the monitor can be a TRUESHIELD™ PATRIOT™ test station monitor. TRUESHIELD and PATRIOT are trademarks owned by Omnimetrix LLC of Buford, Georgia.

The system 400 can utilize existing cellular and satellite systems for increased reliability. Data can be collected, stored, and made to available through an existing data management system over the Internet using a standard web browser.

In other embodiments, the frequency and cost of data transmission can be reduced through the implementation of a mesh network. In such networks, several monitoring points can share a common communication point. The monitoring points can communicate with one another using a short-range wireless network.

Figure 6:
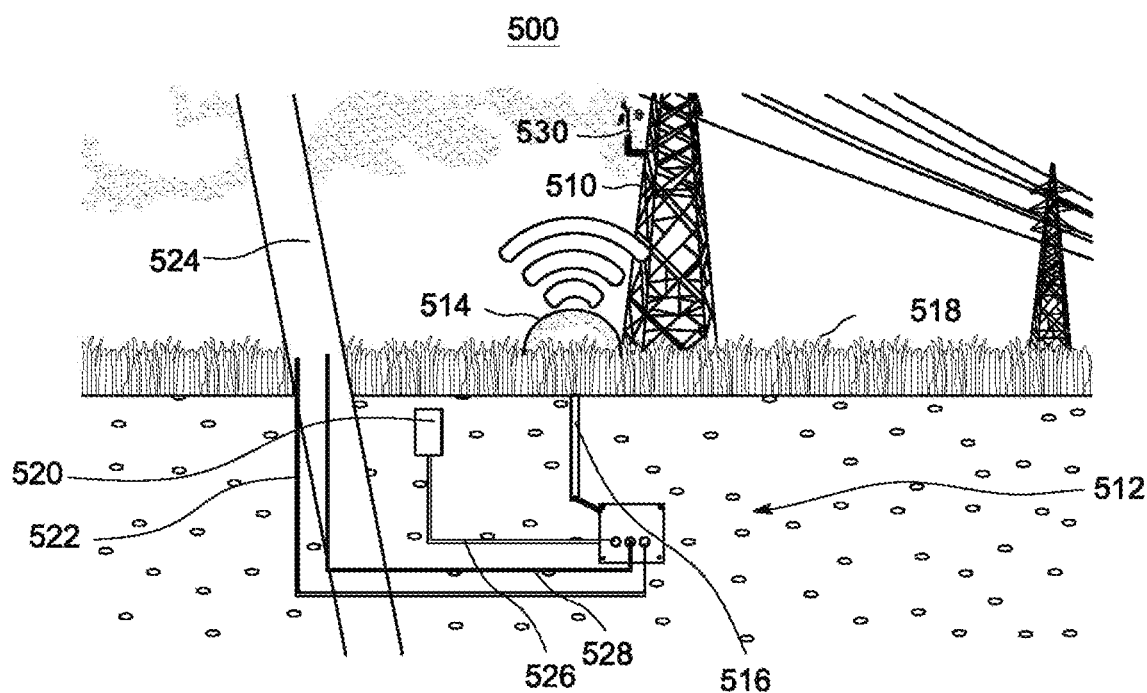
FIG. 6 is a fragmentary schematic view of another embodiment of a system for monitoring the temperature of a remote structure in accordance with this disclosure.

Referring now to FIG. 6 with continuing reference to the foregoing figures, another embodiment a system, generally designated by the numeral 500, for monitoring the temperature of a remote structure 510 is shown. Like the embodiment shown in FIGS. 1-5, the system 500 includes a temperature monitor unit 512 that is buried underneath the remote structure 510.

Unlike the embodiment shown in FIGS. 1-5, the temperature monitor unit 512 does not include an antenna therein. Rather, an antenna is enclosed in a second, insulating enclosure 514 that connects to the temperature monitor unit 512 using a connector 516. The enclosure 514 can be positioned above the ground 518, at least partially. In this exemplary embodiment, the enclosure 514 includes insulating material that has the ability to endure 0.5 hours of fire at a temperature of about 840° C.

The temperature monitor unit 512 can include an external reference electrode 520 and a thermocouple assembly 522 that connect to an extension 524 for the remote structure 510. The external reference unit 520 connects to the reference electrode 520 with a connector 526. The external reference unit 520 connects to the extension 524 with a connector 528 to obtain corrosion potential measurements.

The antenna within the enclosure 514 can provide the temperature monitor unit 512 with the ability to communicate with the data collection unit 112 shown in FIG. 1, the data collection unit 212 shown in FIG. 3, or any other similar type of data collection unit.

A wind velocity sensor or anemometer 530 can be mounted on the remote structure 510 to collect wind velocity measurements. The wind velocity measurements can be transmitted to the temperature monitor unit 512 via a wireless connection or via a wired connection (not shown). In some embodiments, the anemometer 530 will be mounted at a height of about 10 meters above the ground 518.

Supported Features and Embodiments

The detailed description provided above in connection with the appended drawings explicitly describes and supports various features of apparatus and methods for monitoring the temperatures of remote structures. By way of illustration and not limitation, supported embodiments include an apparatus comprising: a thermocouple, a communications device having an antenna and a transmitter for communicating with a remote monitoring system, a controller for controlling the communications device, a power supply for powering the controller and the communications device, and an enclosure for surrounding the communications device, the controller, and the power supply, wherein the enclosure includes a body formed from insulating material with at least one hole therein and with the thermocouple and the antenna extending through the at least one hole, and wherein the controller receives a temperature-dependent voltage from the thermocouple, determines the temperature, and instructs the communications device to activate the transmitter to send information relating to the temperature to the remote monitoring system through the antenna.

Supported embodiments include the foregoing apparatus, wherein the communications device can transmit the information in real-time.

Supported embodiments include any of the foregoing apparatuses, wherein the insulating material is selected from the group consisting of fire proof material and fire resistant material.

Supported embodiments include any of the foregoing apparatuses, wherein the insulating material includes captured fire insulation.

Supported embodiments include any of the foregoing apparatuses, wherein the insulating material has the ability to endure 0.5 hours of fire at a temperature of about 840 degrees Celsius.

Supported embodiments include any of the foregoing apparatuses, wherein the enclosure is buried underground with the ground having the ability to further insulate the insulating material.

Supported embodiments include any of the foregoing apparatuses, wherein the transmitter includes a cellular signal generator.

Supported embodiments include any of the foregoing apparatuses, wherein the cellular signal generator is selected from the group consisting of a function generator, an RF signal generator, a microwave signal generator, a pitch generator, an arbitrary waveform generator, a digital pattern generator, and a frequency generator.

Supported embodiments include any of the foregoing apparatuses, wherein the communications device includes a receiver for receiving instructions for the controller.

Supported embodiments include any of the foregoing apparatuses, wherein the controller includes a processor and memory for storing instructions therein.

Supported embodiments include any of the foregoing apparatuses, further comprising: a data storage device for recording the information relating to the temperature.

Supported embodiments include any of the foregoing apparatuses, further comprising: circuitry for connecting the thermocouple to the controller.

Supported embodiments include any of the foregoing apparatuses, wherein the power supply is a portable power supply.

Supported embodiments include any of the foregoing apparatuses, wherein the power supply is a battery.

Supported embodiments include a method, a kit, a system, and/or means for implementing any of the foregoing apparatuses or a portion thereof.

Supported embodiments include a system for monitoring the temperature of a remote structure comprising: a data collection device, and a temperature monitor unit having a thermocouple, a communications device assembly having an antenna and a transmitter, a power supply for powering the controller and the communications device, and an enclosure for surrounding the communications device and the power supply with the thermocouple and the antenna extending therethrough, wherein the communications device obtains a temperature from the thermocouple and activates the transmitter to send the temperature to the data collection device through the antenna.

Supported embodiments include the foregoing system, wherein the data collection device includes a vehicle selected from the group consisting of a satellite, a drone, a helicopter, and a utility vehicle.

Supported embodiments include any of the foregoing systems, wherein the data collection device includes a line carrier modem.

Supported embodiments include any of the foregoing systems, wherein the data collection device includes remote test station.

Supported embodiments include a method, a kit, an apparatus, and/or means for implementing any of the foregoing systems or a portion thereof.

Supported embodiments include an apparatus comprising: a thermocouple, a communications device having an antenna and a transmitter for communicating with a remote monitoring system, a controller for controlling the communications device, a power supply for powering the controller and the communications device, and an enclosure having a body formed from insulating material for surrounding the antenna, wherein the controller receives a temperature-dependent voltage from the thermocouple, determines the temperature, and instructs the communications device to activate the transmitter to send information relating to the temperature to the remote monitoring system through the antenna.

Supported embodiments include the foregoing apparatus, further comprising: a reference electrode assembly coupled to the controller to obtain corrosion potential measurements.

Supported embodiments include any of the foregoing apparatus, wherein the communications device can transmit the information in real-time.

Supported embodiments include any of the foregoing apparatus, wherein the insulating material is selected from the group consisting of fire proof material and fire resistant material.

Supported embodiments include any of the foregoing apparatus, wherein the insulating material includes captured fire insulation.

Supported embodiments include any of the foregoing apparatus, wherein the insulating material has the ability to endure 0.5 hours of fire at a temperature of about 840 degrees Celsius.

Supported embodiments include a method, a kit, a system, and/or means for implementing any of the foregoing apparatus or a portion thereof.

Supported embodiments can provide various attendant and/or technical advantages in terms of a system that includes a small electronic unit that contains the circuitry, battery pack, and communication means.

Supported embodiments includes a remote temperature monitoring system that is easy to implement, has a low cost, and provides reliable data transfer.

Supported embodiments include a remote temperature monitoring system that can monitor temperatures in real-time. Such embodiments do not require interaction at a monitoring point.

The detailed description provided above in connection with the appended drawings is intended as a description of examples and is not intended to represent the only forms in which the present examples can be constructed or utilized.

It is to be understood that the configurations and/or approaches described herein are exemplary in nature, and that the described embodiments, implementations and/or examples are not to be considered in a limiting sense, because numerous variations are possible.

The specific processes or methods described herein can represent one or more of any number of processing strategies. As such, various operations illustrated and/or described can be performed in the sequence illustrated and/or described, in other sequences, in parallel, or omitted. Likewise, the order of the above-described processes can be changed.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

What is claimed is:

1. An apparatus for remotely monitoring temperature of a structure comprising:
   a temperature monitoring unit comprising a thermocouple, a communication device, having an antenna, controlled by a controller, and a power supply, surrounded by an enclosure, buried underground at a first distance away from the structure,
   wherein the enclosure is buried underground with the ground having the ability to further insulate the insulating material,
   a reference electrode assembly, buried underground at a second distance away from the structure, configured to obtain corrosion measurements,
   an antenna assembly having a transmitter for communicating with a remote monitoring system, located above ground away from the structure, and
   an antenna connector for connecting the antenna assembly to the antenna,
   wherein the enclosure includes a body formed from insulating material with at least one hole therein and with the thermocouple and the antenna connector extending through the at least one hole,
   wherein the controller receives a temperature-dependent voltage from the thermocouple and the corrosion measurements from the reference electrode assembly, determines the temperature of the structure, and instructs the communications device to send information relating to the temperature of the structure to the remote monitoring system through the antenna assembly, and
   wherein the insulating material includes captured fire insulation.

2. The apparatus of claim 1, wherein the transmitter includes a cellular signal generator, and the communications device is configured to transmit the information in real-time.

3. The apparatus of claim 2, wherein the cellular signal generator is selected from the group consisting of a function generator, an RF signal generator, a microwave signal generator, a pitch generator, an arbitrary waveform generator, a digital pattern generator, and a frequency generator.

4. The apparatus of claim 1, wherein the communications device includes a receiver for receiving instructions for the controller.

5. The apparatus of claim 1, wherein the controller includes a processor and memory for storing instructions therein.

6. The apparatus of claim 5, further comprising:
   circuitry for connecting the thermocouple to the controller, and
   a data storage device for recording the information relating to the temperature.

7. The apparatus of claim 6, wherein the data storage device is a data storage device selected from the group consisting of a hard drive disk, a floppy disk, a tape, a compact disc, a DVD, a blu-ray disc, a USB flash drive or memory stick, a secure digital card, and a solid-state drive.

8. The apparatus of claim 1, wherein the antenna assembly is configured to communicate with a data collection unit.

9. The apparatus of claim 1, wherein the communications device is coupled to an anemometer mounted on the structure and is configured to obtain wind velocity measurements from the anemometer.

10. A system for remotely monitoring temperature of a structure comprising:
    a temperature monitoring unit comprising a thermocouple, a communication device, having an antenna, controlled by a controller, and a power supply, surrounded by an enclosure, buried underground at a first distance away from the structure,
    wherein the enclosure is buried underground with the ground having the ability to further insulate the insulating material,
    a reference electrode assembly, buried underground at a second distance away from the structure, configured to obtain corrosion measurements,
    an antenna assembly having a transmitter for communicating with a remote monitoring system, located above ground away from the structure, and
    an antenna connector for connecting the antenna assembly to the antenna,
    wherein the enclosure includes a body formed from insulating material with at least one hole therein and with the thermocouple and the antenna connector extending through the at least one hole, and
    wherein the controller receives a temperature-dependent voltage from the thermocouple and the corrosion measurements from the reference electrode assembly, determines the temperature of the structure, and instructs the communications device to send information relating to the temperature of the structure to the remote monitoring system through the antenna assembly.

11. The apparatus of claim 10, wherein the transmitter includes a cellular signal generator, and the communications device is configured to transmit the information in real-time.

12. The apparatus of claim 11, wherein the cellular signal generator is selected from the group consisting of a function generator, an RF signal generator, a microwave signal generator, a pitch generator, an arbitrary waveform generator, a digital pattern generator, and a frequency generator.

13. The apparatus of claim 10, wherein the communications device includes a receiver for receiving instructions for the controller.

14. The apparatus of claim 10, wherein the controller includes a processor and memory for storing instructions therein.

15. The apparatus of claim 14, further comprising:
    circuitry for connecting the thermocouple to the controller, and a data storage device for recording the information relating to the temperature.

16. The apparatus of claim 15, wherein the data storage device is a data storage device selected from the group consisting of a hard drive disk, a floppy disk, a tape, a compact disc, a DVD, a blu-ray disc, a USB flash drive or memory stick, a secure digital card, and a solid-state drive.

17. The apparatus of claim 10, wherein the antenna assembly is configured to communicate with a data collection unit.

18. The apparatus of claim 10, wherein the communications device is coupled to an anemometer mounted on the structure and is configured to obtain wind velocity measurements from the anemometer.

19. A system for remotely monitoring temperature of a structure comprising:

a temperature monitoring unit comprising a thermocouple, a communication device, having an antenna, controlled by a controller, and a power supply, surrounded by an enclosure, buried underground at a first distance away from the structure, wherein the enclosure is buried underground with the ground having the ability to further insulate the insulating material, a reference electrode assembly, buried underground at a second distance away from the structure, configured to obtain corrosion measurements, an antenna assembly having a transmitter for communicating with a remote monitoring system, located above ground away from the structure, and an antenna connector for connecting the antenna assembly to the antenna, wherein the enclosure includes a body formed from insulating material with at least one hole therein and with the thermocouple and the antenna connector extending through the at least one hole, wherein the controller receives a temperature-dependent voltage from the thermocouple and the corrosion measurements from the reference electrode assembly, determines the temperature of the structure, and instructs the communications device to send information relating to the temperature of the structure to the remote monitoring system through the antenna assembly, and wherein the thermocouple connects to an extension for the structure.

20. The apparatus of claim 19, wherein the insulating material has the ability to endure 0.5 hours of fire at a temperature of about 840 degrees Celsius.

* * * * *